(12) United States Patent
Lorusso

(10) Patent No.: US 7,413,601 B2
(45) Date of Patent: Aug. 19, 2008

(54) KAOLIN PRODUCTS AND THEIR USE

(75) Inventor: Marielle Lorusso, St Austell (GB)

(73) Assignee: Imerys Pigments, Inc., Roswell, GA (US)

( * ) Notice: Subject to any disclaimer, the term of this patent is extended or adjusted under 35 U.S.C. 154(b) by 528 days.

(21) Appl. No.: 10/312,448

(22) PCT Filed: Aug. 17, 2001

(86) PCT No.: PCT/GB01/03707

§ 371 (c)(1),
(2), (4) Date: May 1, 2003

(87) PCT Pub. No.: WO02/16509

PCT Pub. Date: Feb. 28, 2002

(65) Prior Publication Data

US 2005/0126730 A1 Jun. 16, 2005

(30) Foreign Application Priority Data

Aug. 17, 2000 (GB) .................................. 0020179.8

(51) Int. Cl.
C09D 1/00 (2006.01)
C04B 14/04 (2006.01)
C03C 3/247 (2006.01)
D21H 11/00 (2006.01)

(52) U.S. Cl. ..................... 106/486; 106/286.5; 501/44; 162/181.8

(58) Field of Classification Search ............. 106/286.5, 106/486; 501/144, 44; 162/181.8
See application file for complete search history.

(56) References Cited

U.S. PATENT DOCUMENTS

| | | |
|---|---|---|
| 2,158,987 A | 5/1939 | Maloney |
| 2,414,391 A | 1/1947 | Peaker |
| 2,531,396 A | 11/1950 | Carter et al. |
| 2,883,356 A | 4/1959 | Gluesenkamp |
| 3,034,859 A | 5/1962 | Gunn et al. |
| 3,171,718 A | 3/1965 | Gunn et al. |
| 3,291,769 A | 12/1966 | Woodford et al. |
| 3,463,350 A | 8/1969 | Unger |
| 3,526,768 A | 9/1970 | Rai et al. |
| 3,615,806 A | 10/1971 | Torock et al. |
| 3,635,662 A | 1/1972 | Lyons |
| 3,663,260 A | 5/1972 | Poppe et al. |
| 3,790,402 A | 2/1974 | Eastes |
| 3,798,044 A | 3/1974 | Whitley et al. |
| 4,082,880 A | 4/1978 | Zboril |
| 4,102,974 A | 7/1978 | Boni |
| 4,125,411 A | 11/1978 | Lyons |
| 4,176,148 A | 11/1979 | Magder et al. |
| 4,183,991 A | 1/1980 | Smiley et al. |
| 4,198,333 A | 4/1980 | van Bonin et al. |
| 4,221,697 A | 9/1980 | Osborn et al. |
| 4,225,496 A | 9/1980 | Columbus et al. |
| 4,227,920 A | 10/1980 | Chapman et al. |
| 4,233,199 A | 11/1980 | Abolins et al. |
| 4,234,469 A | 11/1980 | Ohta et al. |
| 4,241,142 A | 12/1980 | Kaliski et al. |
| 4,243,574 A | 1/1981 | Manwiller |
| 4,250,077 A | 2/1981 | van Bonin et al. |
| 4,251,576 A | 2/1981 | Osborn et al. |
| 4,298,711 A | 11/1981 | Moulson et al. |
| 4,311,635 A | 1/1982 | Pearson |
| 4,359,497 A | 11/1982 | Magder et al. |
| 4,381,948 A | 5/1983 | McConnell et al. |
| 4,409,344 A | 10/1983 | Moulson et al. |
| 4,414,352 A | 11/1983 | Cohen et al. |
| 4,427,450 A | 1/1984 | Kostansek |
| 4,467,057 A | 8/1984 | Dieck et al. |
| 4,528,235 A | 7/1985 | Sacks et al. |
| 4,543,287 A | 9/1985 | Briggs et al. |
| 4,546,126 A | 10/1985 | Breitenfellner et al. |
| 4,549,930 A * | 10/1985 | Dessauer .................... 162/134 |
| 4,582,866 A | 4/1986 | Shain |
| 4,584,333 A | 4/1986 | Prigent et al. |
| 4,708,975 A | 11/1987 | Shain |
| 4,728,478 A | 3/1988 | Sacks et al. |

(Continued)

FOREIGN PATENT DOCUMENTS

CA 2 089 613 9/1993

(Continued)

OTHER PUBLICATIONS

Brochure: "Kaopaques Delaminated Aluminum Silicates for Paint Systems," Georgia Kaolin Co., 433 N. Broad Street, Elizabeth, NJ 07207, Oct. 1975.

(Continued)

*Primary Examiner*—Jerry A. Lorengo
*Assistant Examiner*—Patricia L Hailey
(74) *Attorney, Agent, or Firm*—Finnegan, Henderson, Farabow, Garrett & Dunner LLP

(57) ABSTRACT

The present invention relates to a particulate kaolin suitable for use as a filler material in compositions for making uncoated paper, the kaolin having a mean particle size ranging from 0.7 μm to 3 μm and a shape factor of at least 60. The invention also relates to compositions comprising a particulate kaolin, and methods for making uncoated paper sheets.

26 Claims, No Drawings

U.S. PATENT DOCUMENTS

| | | | |
|---|---|---|---|
| 4,795,776 A | 1/1989 | Milner | |
| 4,800,103 A | 1/1989 | Jeffs | |
| 4,816,074 A * | 3/1989 | Raythatha et al. | 106/632 |
| 4,820,761 A | 4/1989 | Saito et al. | |
| 4,873,116 A | 10/1989 | Ancker | |
| 4,888,315 A | 12/1989 | Bowman et al. | |
| 4,889,886 A | 12/1989 | Wada et al. | |
| 4,918,127 A | 4/1990 | Adur et al. | |
| 4,943,324 A | 7/1990 | Bundy et al. | |
| 4,966,638 A | 10/1990 | Mudgett | |
| 4,981,521 A | 1/1991 | Bettacchi et al. | |
| 5,085,707 A | 2/1992 | Bundy et al. | |
| 5,104,925 A | 4/1992 | Honda et al. | |
| 5,109,051 A | 4/1992 | Kroenke et al. | |
| 5,112,782 A | 5/1992 | Brown et al. | |
| 5,128,606 A | 7/1992 | Gate et al. | |
| 5,153,039 A | 10/1992 | Porter et al. | |
| 5,167,707 A | 12/1992 | Freeman et al. | |
| 5,168,083 A | 12/1992 | Matthews et al. | |
| 5,169,443 A | 12/1992 | Willis et al. | |
| 5,214,091 A | 5/1993 | Tanaka et al. | |
| 5,234,763 A | 8/1993 | Rosen | |
| 5,292,365 A * | 3/1994 | Delfosse | 106/464 |
| 5,294,654 A | 3/1994 | Hellstern-Burnell et al. | |
| 5,302,404 A | 4/1994 | Rissanen et al. | |
| 5,332,493 A | 7/1994 | Ginn et al. | |
| 5,364,899 A | 11/1994 | Watanabe et al. | |
| 5,376,237 A * | 12/1994 | Ishiguro et al. | 162/134 |
| 5,411,587 A | 5/1995 | Willis et al. | |
| 5,416,151 A | 5/1995 | Tanaka | |
| 5,439,558 A | 8/1995 | Bergmann et al. | |
| 5,454,865 A | 10/1995 | Ginn et al. | |
| 5,478,388 A * | 12/1995 | Gane et al. | 106/415 |
| 5,516,829 A | 5/1996 | Davis et al. | |
| 5,522,924 A | 6/1996 | Smith et al. | |
| 5,573,946 A | 11/1996 | Haxell et al. | |
| 5,578,659 A | 11/1996 | Anada et al. | |
| 5,624,488 A | 4/1997 | Forbus et al. | |
| 5,635,279 A | 6/1997 | Ma et al. | |
| 5,645,635 A | 7/1997 | Behl et al. | |
| 5,665,183 A | 9/1997 | Kresge et al. | |
| 5,685,900 A | 11/1997 | Yuan et al. | |
| 5,695,608 A | 12/1997 | Yagi et al. | |
| 5,700,560 A | 12/1997 | Kotani et al. | |
| 5,707,912 A | 1/1998 | Lowe et al. | |
| 5,735,946 A | 4/1998 | Bloodworth et al. | |
| 5,749,958 A | 5/1998 | Behl et al. | |
| 5,810,998 A | 9/1998 | Arrington-Webb et al. | |
| 5,846,309 A | 12/1998 | Freeman et al. | |
| 5,879,512 A | 3/1999 | McGenity et al. | |
| 5,883,173 A | 3/1999 | Elspass et al. | |
| 5,897,411 A | 4/1999 | Stark et al. | |
| 5,916,420 A * | 6/1999 | Wurster et al. | 162/137 |
| 5,925,454 A | 7/1999 | Bekele | |
| 5,948,156 A | 9/1999 | Coutelle et al. | |
| 5,952,093 A | 9/1999 | Nichols et al. | |
| 6,031,036 A | 2/2000 | Rosenquist et al. | |
| 6,087,016 A | 7/2000 | Feeney et al. | |
| 6,117,541 A | 9/2000 | Frisk | |
| 6,149,723 A | 11/2000 | Pruett et al. | |
| 6,186,335 B1 | 2/2001 | Arrington-Webb et al. | |
| 6,193,831 B1 | 2/2001 | Overcash et al. | |
| 6,232,389 B1 | 5/2001 | Feeney et al. | |
| 6,238,793 B1 | 5/2001 | Takahashi et al. | |
| 6,245,395 B1 | 6/2001 | Falat et al. | |
| 6,262,161 B1 | 7/2001 | Betso et al. | |
| RE37,385 E | 9/2001 | Okada et al. | |
| 6,312,511 B1 | 11/2001 | Bilimoria et al. | |
| 6,358,576 B1 | 3/2002 | Adur et al. | |
| 6,402,826 B1 | 6/2002 | Yuan et al. | |
| 6,416,817 B1 | 7/2002 | Rangwalla et al. | |
| 6,447,845 B1 | 9/2002 | Nanavati et al. | |
| 6,447,860 B1 | 9/2002 | Mueller et al. | |
| 6,465,064 B1 | 10/2002 | Branch | |
| 6,531,183 B1 * | 3/2003 | Cason et al. | 427/361 |
| 6,531,196 B1 | 3/2003 | Aho et al. | |
| 6,537,363 B1 | 3/2003 | Golley et al. | |
| 6,545,079 B1 | 4/2003 | Nurmi et al. | |
| 6,554,892 B1 | 4/2003 | Manasso et al. | |
| 6,564,199 B1 | 5/2003 | Pruett et al. | |
| 6,610,137 B2 * | 8/2003 | Golley et al. | 106/486 |
| 6,616,749 B1 * | 9/2003 | Husband et al. | 106/486 |
| 6,623,866 B2 | 9/2003 | Migliorini et al. | |
| 6,632,868 B2 | 10/2003 | Qian et al. | |
| 6,758,895 B2 * | 7/2004 | Wesley | 106/486 |
| 6,759,463 B2 | 7/2004 | Lorah et al. | |
| 6,790,896 B2 | 9/2004 | Chaiko | |
| 6,794,042 B1 | 9/2004 | Merlin et al. | |
| 6,838,507 B2 | 1/2005 | Chou et al. | |
| 6,841,211 B1 | 1/2005 | Knoll et al. | |
| 6,884,450 B2 | 4/2005 | Wu et al. | |
| 6,887,302 B2 | 5/2005 | Rajagopalan et al. | |
| 6,887,351 B1 * | 5/2005 | Lunden et al. | 162/181.2 |
| 6,914,095 B2 | 7/2005 | Lorah et al. | |
| 6,942,897 B2 | 9/2005 | Joyce et al. | |
| 7,214,264 B2 * | 5/2007 | Jones et al. | 106/486 |
| 7,226,005 B2 * | 6/2007 | Jones et al. | 241/21 |
| 7,306,668 B2 * | 12/2007 | Pring et al. | 106/486 |
| 2003/0187120 A1 | 10/2003 | Chaiko et al. | |
| 2004/0033379 A1 | 2/2004 | Grunlan et al. | |
| 2004/0161594 A1 | 8/2004 | Joyce et al. | |
| 2004/0241475 A1 | 12/2004 | Morabito | |
| 2005/0145138 A1 | 7/2005 | Raju et al. | |
| 2005/0171243 A1 | 8/2005 | Hemmings et al. | |
| 2005/0228096 A1 | 10/2005 | Kirsten et al. | |
| 2005/0228104 A1 | 10/2005 | Feeney et al. | |

FOREIGN PATENT DOCUMENTS

| | | |
|---|---|---|
| CA | 2 467 284 | 11/2004 |
| DE | 2 241 577 | 3/1973 |
| DE | 24 49 656 | 12/1975 |
| DE | 26 58 814 | 2/1978 |
| DE | 28 18 954 | 11/1978 |
| DE | 27 39 620 | 3/1979 |
| DE | 30 12 235 | 10/1980 |
| DE | 30 47 269 | 7/1982 |
| DE | 36 32 606 | 4/1987 |
| DE | 35 36 371 | 5/1987 |
| DE | 35 40 524 | 5/1987 |
| DE | 37 50 864 | 4/1988 |
| DE | 38 84 605 | 8/1988 |
| DE | 43 01 730 | 7/1993 |
| DE | 42 13 746 | 10/1993 |
| DE | 100 10 941 | 9/2001 |
| EP | 0 001 066 | 4/1980 |
| EP | 0 026 075 | 4/1981 |
| EP | 0 054 424 | 6/1982 |
| EP | 0 132 094 | 1/1985 |
| EP | 0 132 228 | 1/1985 |
| EP | 0 160 777 | 11/1985 |
| EP | 0 163 427 | 12/1985 |
| EP | 0 217 626 | 4/1987 |
| EP | 0 222 138 | 5/1987 |
| EP | 0 222 298 | 5/1987 |
| EP | 0 239 986 | 10/1987 |
| EP | 0 245 553 | 11/1987 |
| EP | 0 262 649 | 4/1988 |
| EP | 0 274 888 | 7/1988 |
| EP | 0 341 981 | 11/1989 |
| EP | 0 352 714 | 1/1990 |
| EP | 0 456 363 | 11/1991 |
| EP | 0 204 324 | 2/1992 |
| EP | 0 475 434 | 3/1992 |

| | | | | | | |
|---|---|---|---|---|---|---|
| EP | 0 524 635 | 1/1993 | | JP | 08022945 | 1/1996 |
| EP | 0 528 078 | 2/1993 | | JP | 09 111696 | 4/1997 |
| EP | 0 543 793 | 5/1993 | | JP | 10114854 | 5/1998 |
| EP | 0 586 904 | 3/1994 | | JP | 10 298358 | 11/1998 |
| EP | 0 588 239 | 3/1994 | | JP | 11 129379 | 5/1999 |
| EP | 0 589 461 | 3/1994 | | JP | 11 129381 | 5/1999 |
| EP | 0 596 442 | 5/1994 | | JP | 2000 265391 | 9/2000 |
| EP | 0 494 594 | 10/1995 | | JP | 2000 303386 | 10/2000 |
| EP | 0 691 375 | 1/1996 | | JP | 2000345032 | 12/2000 |
| EP | 0 764 739 | 3/1997 | | JP | 2001 020200 | 1/2001 |
| EP | 0 804 505 | 11/1997 | | JP | 2001098149 | 4/2001 |
| EP | 0 824 130 | 2/1998 | | JP | 2002 363885 | 12/2002 |
| EP | 0 991 530 | 4/2000 | | JP | 2003 192861 | 7/2003 |
| EP | 0 991 815 | 4/2000 | | JP | 2003 292678 | 10/2003 |
| EP | 1 088 852 | 4/2001 | | JP | 2004 003118 | 1/2004 |
| EP | 1 245 730 | 10/2002 | | JP | 2004 034390 | 2/2004 |
| EP | 1 484 176 | 12/2004 | | PT | 77224 | 8/1983 |
| EP | 1 512 552 | 3/2005 | | WO | WO 80/01167 | 6/1980 |
| FR | 1 299 089 | 7/1962 | | WO | WO 80/02430 | 11/1980 |
| FR | 2 150 953 | 4/1973 | | WO | WO 88/05804 | 8/1988 |
| FR | 2 273 040 | 12/1975 | | WO | WO 90/11605 | 10/1990 |
| FR | 2 359 874 | 2/1978 | | WO | WO 93/04119 | 3/1993 |
| FR | 2 389 645 | 12/1978 | | WO | WO 94/07956 | 4/1994 |
| FR | 2 452 511 | 10/1980 | | WO | WO 96/15321 | 5/1996 |
| FR | 2 558 168 | 7/1985 | | WO | WO 96/22329 | 7/1996 |
| FR | 2 774 689 | 8/1999 | | WO | WO 97/00910 | 1/1997 |
| FR | 2 822 086 | 9/2002 | | WO | WO 97/32934 | 9/1997 |
| GB | 819 050 | 8/1959 | | WO | WO 97/34956 | 9/1997 |
| GB | 1032536 | 6/1966 | | WO | WO 9837152 | 8/1998 |
| GB | 1 100 496 | 1/1968 | | WO | WO 98/54409 | 12/1998 |
| GB | 1 101 950 | 2/1968 | | WO | WO 98/54410 | 12/1998 |
| GB | 1118723 | 7/1968 | | WO | WO 98/56598 | 12/1998 |
| GB | 1 136 350 | 12/1968 | | WO | WO 98/56860 | 12/1998 |
| GB | 1 241 177 | 7/1971 | | WO | WO 98/56861 | 12/1998 |
| GB | 1 310 933 | 3/1973 | | WO | WO 98/58613 | 12/1998 |
| GB | 1375057 | 11/1974 | | WO | WO 99/01504 | 1/1999 |
| GB | 1469028 | 3/1977 | | WO | WO 99/61703 | * 2/1999 |
| GB | 1493393 | 11/1977 | | WO | WO 99/41309 | 8/1999 |
| GB | 1 496 088 | 12/1977 | | WO | WO 99/51815 | * 10/1999 |
| GB | 1513657 | 6/1978 | | WO | WO 99/58613 | 11/1999 |
| GB | 1597213 | 9/1981 | | WO | WO 00/05311 | 2/2000 |
| GB | 2223758 | 4/1990 | | WO | WO 00/59840 | 10/2000 |
| GB | 2240398 | 7/1991 | | WO | WO 00/59841 | 10/2000 |
| GB | 2 306 392 | 5/1997 | | WO | WO 00/66657 | 11/2000 |
| GB | 2310215 | 8/1997 | | WO | WO 00/76862 | 12/2000 |
| JP | 51005383 | 1/1976 | | WO | WO 00/78540 | 12/2000 |
| JP | 53016063 | 2/1978 | | WO | WO 01/12708 | 2/2001 |
| JP | 54010394 | 1/1979 | | WO | WO 01/46307 | 6/2001 |
| JP | 54047751 | 4/1979 | | WO | WO 01/53159 | 7/2001 |
| JP | 55 129439 | 10/1980 | | WO | WO 01/59215 | 8/2001 |
| JP | 55131024 | 10/1980 | | WO | WO 01/66627 | 9/2001 |
| JP | 59074152 | 4/1984 | | WO | WO 01/66635 | 9/2001 |
| JP | 60023448 | 2/1985 | | WO | WO 01/66655 | 9/2001 |
| JP | 60038455 | 2/1985 | | WO | WO 01/87580 | 11/2001 |
| JP | 60084364 | 5/1985 | | WO | WO 01/87596 | 11/2001 |
| JP | 60161443 | 8/1985 | | WO | WO 02/16509 | 2/2002 |
| JP | 60235858 | 11/1985 | | WO | WO 03/039228 | 5/2003 |
| JP | 62116667 | 5/1987 | | WO | WO 2004/046463 | 6/2004 |
| JP | 62232452 | 10/1987 | | WO | WO 2004/074574 | 9/2004 |
| JP | 63132964 | 6/1988 | | WO | WO 2005/013704 | 2/2005 |
| JP | 63175047 | 7/1988 | | WO | WO 2005/014283 | 2/2005 |
| JP | 02-018362 | 1/1990 | | WO | WO 2005/044938 | 5/2005 |
| JP | 02034653 | 2/1990 | | WO | WO 2005/047372 | 5/2005 |
| JP | 02045551 | 2/1990 | | WO | WO 2005/061608 | 7/2005 |
| JP | 04122752 | 4/1992 | | WO | WO 2005/108222 | 11/2005 |
| JP | 4 270650 | 9/1992 | | | | |
| JP | 05262974 | 10/1993 | | | | |
| JP | 06016918 | 1/1994 | | | | |
| JP | 06065490 | 3/1994 | | | | |
| JP | 06502684 | 3/1994 | | | | |
| JP | 06145442 | 5/1994 | | | | |
| JP | 07502068 | 3/1995 | | | | |
| JP | 07 251486 | 10/1995 | | | | |

OTHER PUBLICATIONS

Burgess, Malcolm, "Kaolin, a Glaciers Gift to Georgia," 1985.
Clay Minerals Society Homepage, http://cms.lanl.gov/instruct.html, "Instructions for Authors, Clays and Clay Minerals," *Instructions for Authors*, p. 4 of 5.

Jepson, W. P., "Kaolins, their properties and uses," *Phil. Trans. R. Soc. Lond.*, A311, 411-432, 1984.

Swan, A., "Realistic paper tests for various printing processes," *Printing Technology*, 13(1), 9-22, Apr. 1969.

Abstract, Japanese Patent No. 08012886A, publication date Jan. 1996.

Abstract, German Patent No. 3679147.

Abstract, German Patent No. 3689760.

Abstract, German Patent No. 3565272.

Abstract, German Patent No. 3466547.

Co-pending U.S. Appl. No. 09/608,164, filed Jun. 3, 2000.

Co-pending U.S. Appl. No. 09/647,720, filed Oct. 4, 2000.

Co-pending U.S. Appl. No. 09/930,994, filed Aug. 17, 2001.

Co-pending U.S. Appl. No. 09/937,671, filed Dec. 20, 2001.

Co-pending U.S. Appl. No. 09/937,729, filed Dec. 20, 2001.

Co-pending U.S. Appl. No. 10/077,936, filed Jul. 18, 2002, ABN.

Co-pending U.S. Appl. No. 10/227,285, filed Aug. 26, 2002.

Co-pending U.S. Appl. No. 10/233,599, filed Sep. 4, 2002, ABN.

Co-pending U.S. Appl. No. 10/324,019, filed Dec. 20, 2002.

English-language machine translation of FR 1 299 089, published Jul. 20, 1962, from AltaVista's Babelfish.

English language Derwent Abstract for FR 2 822 086, published Sep. 20, 2002.

English language Derwent Abstract for JP 4 270650, published Sep. 28, 1992.

English language Derwent Abstract for JP 55 129439, published Oct. 7, 1980.

English language Derwent Abstract for JP 07 251486, published Oct. 3, 1995.

English language Derwent Abstract for JP 09 111696, published Apr. 28, 1997.

English language Derwent Abstract for JP 10 298358, published Nov. 10, 1998.

English language Derwent Abstract for JP 11 129381, published May 18, 1999.

English language Derwent Abstract for JP 11 129379, published May 18, 1999.

English language Derwent Abstract for JP 2000 265391, published Sep. 26, 2000.

English language Derwent Abstract for JP 2000 303386, published Oct. 31, 2000.

English language Derwent Abstract for JP 2001 020200, published Jan. 23, 2001.

English language Derwent Abstract for JP 2002 363885, published Dec. 18, 2002.

English language Derwent Abstract for JP 2003 192861, published Jul. 9, 2003.

English language Derwent Abstract for JP 2003 292678, published Oct. 15, 2003.

English language Derwent Abstract for JP 2004 003118, published Jan. 8, 2004.

English language Derwent Abstract for JP 2004 034390, published Feb. 5, 2004.

English language Derwent Abstract for PT 77224, published Aug. 19, 1983.

\* cited by examiner

KAOLIN PRODUCTS AND THEIR USE

The present invention relates to kaolin products and blends or compositions containing them. In particular, it relates to particulate kaolin products and blends containing them for use as fillers in making uncoated, e.g. supercalendered (SC) papers and their production.

Mineral fillers are used in the production of most papers for printing or writing applications. The incorporation of such fillers together with cellulose fibres in a paper making composition reduces the overall cost of the raw materials and can improve optical and printing properties of the paper. However, adding fillers causes reduction in the strength of the paper, so there is a practical limit to the amount of fillers normally used in the paper making composition.

Highly filled uncoated papers can compete with some coated paper grades.

Suitable smoothness, gloss, density per unit area and printing ink porosity can be achieved by multiple calendering of the filled paper sheets. The well known process of calendering involves passing the sheets of paper between rollers to compress the sheets.

Highly filled uncoated, calendered papers having properties approaching those of coated papers are generally known as supercalendered (SC) papers. Such papers can be used for various applications, particularly involving printing upon the paper by rotogravure or offset processes.

Kaolin materials have been widely used in the prior art as fillers for making papers, especially SC papers. One purpose of the present invention is to provide hydrous kaolin materials suitable for use as improved fillers in the production of uncoated writing and printing grade papers, especially SC papers.

According to the present invention in a first aspect there is provided a particulate kaolin suitable for use as a filler material in compositions for making uncoated paper, the kaolin having a mean particle size of between 0.7 µm and 3 µm and a shape factor of at least 60.

In this specification, mean particle size and all other particle size properties are as determined for a fully dispersed dilute aqueous suspension of the particulate material in question by sedimentation using a SEDIGRAPH™ 5100 machine, (supplied by the Micromeritics Corporation) in a well-known manner.

The mean particle size of the kaolin product may be from 0.9 µm to 2.5 µm, especially from 0.9 µm to 1.2 µm, or from 1.2 µm to 1.7 µm.

The powder brightness of the particulate kaolin according to the first aspect may be at least 80 ISO units, preferably at least 83 ISO units measured in a well-known manner according industry (TAPPI) standard procedures.

The shape factor of the particles of the particulate kaolin according to the invention is at least 60, preferably at least 65, in some cases at least 70 or more. The expression 'shape factor' as used herein means the average value (on a weight average basis) of the ratio of mean particle diameter to particle thickness for a population of particles of varying size and shape (i.e. in this case the particulate kaolin) as measured using the electrical conductivity method and apparatus described in GB-A-2240398, U.S. Pat. No. 5,128,606 and EP-A-528078 and using the equations derived in those patent specifications. 'Mean particle diameter' is here defined as the diameter of a circle, which has the same area as the largest face of the particle. In the electrical conductivity measurement method described in the said specifications, the electrical conductivity of a fully dispersed aqueous suspension of the particles under test is caused to flow through an elongated tube. Measurements of the electrical conductivity are taken between (a) a pair of electrodes separated longitudinally along the axis of the tube and (b) a pair of electrodes separated transversely across the tube. The shape factor of the particles under test is calculated from the two conductivity measurements.

The particulate kaolin according to the first aspect of the invention is a hydrous kaolin which may be obtained from a primary or secondary (sedimentary) source and may be processed using known procedures to have the specified properties. The processing procedures may for example involve comminution, e.g. grinding or milling, and particle size classification, e.g. using screens, centrifuges, cyclones, air classifiers and the like.

The particulate kaolin according to the first aspect of the invention may be subjected to further refinement or beneficiation treatments to remove impurities and to improve properties, e.g. optical properties such as brightness. Such treatments may be known per se and may be selected for example from magnetic impurity separation, froth flotation, selective flocculation, impurity leaching and bleaching.

The particulate kaolin according to first aspect of the present invention may consist of at least 95% by weight kaolinite, preferably at least 98% by weight kaolinite.

The particulate kaolin according to the first aspect may be blended with other particulate filler materials for use in paper making compositions. Such other filler materials may be known per se and may be selected for example from other hydrous kaolin, calcined kaolin, talc, calcium sulphate, titanium dioxide and alkaline earth metal carbonate, especially calcium carbonate.

According to the present invention in a second aspect there is provided a blend or composition of fillers for use in compositions for making uncoated paper, especially so called wood containing or groundwood paper, comprises (a) particulate kaolin according to the first aspect and (b) a particulate calcium carbonate.

The blend according to the second aspect may comprise from 5% to 95%, especially from 20% to 80%, by weight of the kaolin according to the first aspect and from 95% to 5%, especially from 80% to 20%, by weight of the particulate calcium carbonate product.

For blends according to the second aspect where the kaolin according to the first aspect has a mean particle size of 1.2 µm or more the weight ratio of kaolin:calcium carbonate in the blend may be 50:50 or more, e.g. from 60:40 to 80:20 where the kaolin has a mean particle size greater than 1.2 µm and not greater than 1.7 µm.

For blends according to the second aspect where the kaolin according to the first aspect has a mean particle size of 1.2 µm or less the weight ratio of kaolin:calcium carbonate in the blend may be 50:50 or less, e.g. from 40:60 to 20:80 where the kaolin has a mean particle size less than 1.2 µm and not less than 0.9 µm.

The blend according to the second aspect of the invention benefits from the enhancement of properties such as brightness provided by the calcium carbonate as well as retaining desirable properties such as gloss and print quality provided by the kaolin.

We have found, unexpectedly, that the kaolin according to the first aspect shows a superior combination of properties when used as a filler in paper making compositions, especially when used in the form of a blend with calcium carbonate, compared with prior art kaolin fillers used in a comparable manner. Use of such fillers allows paper especially wood containing paper to be made having an improved combination of porosity, strength, sheet gloss, sheet brightness, print density and print gloss especially when printed upon by a gravure printing process or an offset printing process, especially a heatset offset process. Such an improved combination of properties is obtained especially when the paper sheet made using the said filler is heavily compressed by calendering, e.g. is supercalendered. The combination of properties may have a particularly good brightness when the composition is calcium carbonate rich and particularly good gloss and print quality properties when the composition is kaolin rich.

The papermaking composition in which the kaolin according to the first aspect or the blend according to the second aspect is used may be obtained from a groundwood pulp composition of cellulose fibres, i.e. from a pulp containing from 70% to 100% by weight of a so-called mechanical pulp, which is one that has been mechanically refined, e.g. obtained from logs and ground, refined and bleached or obtained from wood chips and refined (optionally under pressure and/or at elevated temperature and/or with the use of chemicals) and bleached. The composition may contain a minor percentage, e.g. up to 30% by weight, of a so called chemical pulp, i.e. one which has been chemically treated to remove lignin.

We have found that particularly beneficial results are obtained in use of the filler blend according to the second aspect of the invention when the filler blend comprises calcium carbonate having (i) a mean particle size of from 0.4 μm to 1.5 μm, especially from 0.7 μm to 1.3 μm; and (ii) a steepness factor of at least 40, preferably at least 50, especially at least 60.

The expression 'steepness factor', (sometimes referred to as 'narrowness') as used herein refers to the steepness of the particle size distribution curve as measured by the SEDIGRAPH 5100 machine in the manner described earlier and is given by the expression $100 \times (d_{30} \div d_{70})$, where $d_{30}$ is the value of the particle size less than which there are 30% by weight of the particles and $d_{70}$ is the value of the particle size less than which there are 70% by weight of the particles.

The said calcium carbonate may comprise a so called ground carbonate, i.e. a product obtained from natural sources, e.g. marble, chalk or limestone, and processed to have appropriate properties by known treatments involving at least one grinding step.

Alternatively, the calcium carbonate may be synthesised, e.g. by chemical precipitation, e.g. by the reaction in an aqueous medium of carbon dioxide and lime (calcium hydroxide). Carbonate products made in this way may be mixed materials optionally containing other fine solids, e.g. fibres or particulate solids, present in the aqueous medium when the precipitation reaction is carried out. Such other solids become bonded to the calcium carbonate crystals during the precipitation of the calcium carbonate crystals. Examples of composite filler materials produced in this way are described in our EP 892,019.

The calcium carbonate product used to form the blend according to the second aspect of the invention may include a chemical additive employed to provide resistance to acidic conditions which are present in some papermaking systems. Such an additive is described for example in U.S. Pat. No. 5,593,489.

The kaolin according to the first aspect and the blend according to the second aspect of the invention may be employed in a paper making composition and paper sheets, especially paper sheets to be calendered and printed upon by a gravure or offset printing process, may be made using such a composition all in a known manner.

Embodiments of the present invention will now be described by way of example with reference to the following Examples.

EXAMPLE 1

Comparative

A paper pulp composition was prepared using an 80:20 (by weight) blend of mechanical and chemical pulps. The composition was formed into a dilute aqueous suspension (containing less than 1% by weight solids) by addition of water. The filler consisted of a 70:30 (by weight) kaolin-rich blend of kaolin and precipitated calcium carbonate (pcc). The kaolin, Kaolin 1, had the following properties:
(i) percentage by weight of particles smaller than 2 μm: 50%;
(ii) mean particle size: 1.6 μm;
(iii) shape factor 45.

The pcc, PCC1, had the following properties:
(i) percentage by weight of particles smaller than 2 μm: 95%;
(ii) mean particle size: 0.9 μm;
(iii) additive: 5% by weight (active based on the dry weight of calcium carbonate) of a neutrally buffering chemical comprising a solution of an aluminium compound and phosphoric acid.

Retention aid chemical commercially available under the trade name Percol 292 was added in an amount of 0.02% by weight (active based on the dry weight of solids present) to the filler containing pulp suspension.

Handsheets of grammage 57 $g.m^{-2}$ were made from the suspension using a standard semi-automatic handsheet former according to TAPPI standard procedures. The handsheets were conditioned for 24 hours in a room at a temperature of 23° C. and a relative humidity of 50%. The conditioned handsheets were calendered using a laboratory soft nip calender. The calendering conditions were as follows:
(i) roll temperature: 100° C.;
(ii) nip pressure: 300 $kN.m^{-2}$;
(iii) speed: 30 $m.min^{-1}$;
(iv) number of nips: 4 per side.

The properties specified in Tables 1 to 3 later of the handsheets produced were measured according to industry standard (TAPPI) procedures well known to those skilled in the art. The results which were obtained for these measurements are also shown in Tables 1 to 3 later.

EXAMPLE 2

Invention Embodiment

The procedure used in Example 1 was repeated to prepare and measure the properties of handsheets except that the kaolin used in the filler composition was a different kaolin, Kaolin 2, having the following properties:
(i) percentage by weight of particles smaller than 2 um: 50%;
(ii) mean particle size: 1.6 μm;
(iii) shape factor: 70.

The resulting calendered handsheets had the properties which are shown in Tables 1 to 3 later.

EXAMPLE 3

Comparative

The procedure used in Example 1 to prepare and measure the properties of handsheets was repeated except that the percentage by weight of Kaolin 1 used in the filler composition was 30%, the percentage by weight of PCC 1 being 70%.

The resulting calendered handsheets had the properties which are also shown in Tables 1 to 3 later.

EXAMPLE 4

Invention Embodiment

The procedure used in Example 1 to prepare and measure the properties of handsheets was repeated except that (i) the percentages by weight of kaolin and pcc (PCC 1) were respectively 30% and 70% by weight and (ii) the kaolin used in the filler composition was a further different kaolin, Kaolin 3, having the following properties:
(ii) percentage by weight of particles smaller than 2 um: 75%;
(ii) mean particle size: 1.0 μm;
(iii) shape factor: 70.

The resulting calendered handsheets had the properties which are shown in Tables 1 to 3 later.

Results

The results obtained for the measurements on the handsheets made in Examples 1 to 4 are given in Table 1 to 3 as follows.

TABLE 1

| Example No. | Percent by weight CaCO$_3$ | Sheet light scattering coefficient (F8) m$^2$kg$^{-2}$ | Sheet gloss Tappi 75° % | Bendtsen porosity ml · min$^{-1}$ |
|---|---|---|---|---|
| 1 (comp) | 30 | 69 | 40 | 21 |
| 2 (inv) | 30 | 67 | 42 | 19 |
| 3 (comp) | 70 | 81.5 | 36 | 31 |
| 4 (inv) | 70 | 79 | 43 | 25 |

TABLE 2

| Example No. | Weight Percent CaCO$_3$ | Rotogravure Print density | Rotogravure Print gloss | Roto Missing Dots % |
|---|---|---|---|---|
| 1 (comp) | 30 | 1.38 | 33 | 4.3 |
| 2 (inv) | 30 | 1.39 | 34 | 3.5 |
| 3 (comp) | 70 | 1.22 | 30 | 3.5 |
| 4 (inv) | 70 | 1.24 | 32 | 3.5 |

TABLE 3

| Example No. | Weight Percent CaCO$_3$ | Offset Print density Dry | Offset Print density litho | Offset Print Gloss Dry | Offset Print gloss litho |
|---|---|---|---|---|---|
| 1 (comp) | 30 | 1.24 | 1.14 | 41 | 23 |
| 2 (inv) | 30 | 1.24 | 1.13 | 44 | 23 |
| 3 (comp) | 70 | 1.25 | 1.17 | 41 | 18 |
| 4 (inv) | 70 | 1.25 | 1.14 | 44 | 20 |

The results in Tables 1 to 3 illustrate the improved combination of properties obtained by using kaolins embodying the invention (Kaolins 2 and 3) in blends with particulate calcium carbonate.

The invention claimed is:

1. A particulate kaolin,
   wherein the kaolin has a mean particle size ranging from 0.9 μm to 2.5 μm, and a shape factor of at least 60.
2. The particulate kaolin according to claim 1, wherein the shape factor is at least 65.
3. A composition comprising filler materials,
   wherein the composition comprising filler materials comprises the particulate kaolin according to claim 1, and at least one additional filler chosen form hydrous kaolin, calcined kaolin, talc, calcium sulfate and alkaline earth metal carbonates.
4. The composition according to claim 3, wherein the composition comprises particulate kaolin in amount ranging from at least 50% by weight, relative to the total weight of the composition.
5. The composition according to claim 4, wherein the composition comprises particulate kaolin in amount ranging from 60% to 80% by weight, relative to the total weight of the composition.
6. The composition according to claim 3, wherein the at least one additional filler comprises calcium carbonate.
7. The composition according to claim 6, wherein the calcium carbonate comprises a material obtained from a natural source and processed by grinding.
8. The composition according to claim 6, wherein the calcium carbonate comprises a material prepared by chemical synthesis.
9. The composition according to claim 8, wherein at least one additional solid is bonded to the calcium carbonate.
10. The composition according to claim 6, wherein the calcium carbonate has a mean particle size ranging from 0.5 μm to 1.5 μm.
11. The composition according to claim 10, wherein the calcium carbonate has a mean particle size ranging from 0.7 μm to 1.3 μm.
12. The composition according to claim 6, wherein the calcium carbonate has a steepness factor of at least 40.
13. The composition according to claim 12, wherein the calcium carbonate has a steepness factor of at least 50.
14. The composition according to claim 6, wherein the calcium carbonate is in the form of a composition containing at least one chemical additive in an amount ranging from greater than 0 to 15% by weight on an active basis,
   wherein said at least one chemical additive is capable of stabilizing the carbonate in acidic conditions.
15. The composition according to claim 6, wherein the particulate kaolin has a mean particle size of at least 1.2 μm, and
   wherein the weight ratio of kaolin:calcium carbonate in the composition is at least 50:50.
16. The composition according to claim 15, wherein the particulate kaolin has a mean particle size ranging from 1.2 μm to 1.7 μm, and
   wherein the weight ratio of kaolin:calcium carbonate in the composition ranges from 60:40 to 80:20.
17. The composition according to claim 6, wherein the particulate kaolin has a mean particle size ranging from 0.9 μm to 1.2 μm, and
   wherein the weight ratio of kaolin:calcium carbonate in the composition to 50:50 or less.
18. The composition according to claim 17, wherein the particulate kaolin has a mean particle size ranging from 1.2 μm to 0.9 μm, and
   wherein the weight ratio of kaolin:calcium carbonate ranges from 40:60 to 20:80.
19. A method of making uncoated paper sheets, comprising preparing an aqueous paper-making composition from a pulp and mineral filler particles, and
   forming the composition into paper sheets,
   wherein the mineral filler particles comprise a composition according to claim 3.
20. The method according to claim 19, wherein the paper sheets are calendared by a supercalendar process.

21. The method according to claim 19, wherein the pulp comprises mechanical pulp in an amount ranging from at least 70% by weight.

22. The method according to claim 19, wherein the paper sheets are suitable for printing upon by a process chosen from a gravure printing process and an offset printing process.

23. A method of making uncoated paper sheets, comprising preparing an aqueous paper-making composition from a pulp and mineral filler particles, and forming the composition into paper sheets, wherein the mineral filler particles comprise a particulate kaolin according to claim 1.

24. The method according to claim 23, wherein the paper sheets are calendared by a supercalendar process.

25. The method according to claim 23, wherein the pulp comprises mechanical pulp in an amount ranging from at least 70% by weight.

26. The method according to claim 23, wherein the paper sheets are suitable for printing upon by a process chosen from a gravure printing process and an offset printing process.

* * * * *